United States Patent
Torres

(10) Patent No.: US 6,714,192 B1
(45) Date of Patent: Mar. 30, 2004

(54) COMBINED STILL CAMERA AND VIDEO CAMERA DEVICE UTILIZING OPTICS TO SIMULTANEOUSLY PROVIDE THE SAME VIEW TO BOTH CAMERAS

(76) Inventor: Antonio Agustin Checa Torres, Rio Almedinilla 8., 29649 Mijas (Malaga) (ES)

( * ) Notice: Subject to any disclaimer, the term of this patent is extended or adjusted under 35 U.S.C. 154(b) by 0 days.

(21) Appl. No.: 09/249,759

(22) Filed: Feb. 16, 1999

(51) Int. Cl.$^7$ ............................................. H04N 5/225
(52) U.S. Cl. ................ 345/335; 348/207.99; 348/220.1
(58) Field of Search ........................ 348/207.99, 207.2, 348/272.1, 231.99, 239, 335, 337, 340, 343, 344, 64, 220.1; 359/822, 823, 831; 396/77, 429

(56) References Cited

U.S. PATENT DOCUMENTS

| | | | | |
|---|---|---|---|---|
| 3,825,328 A | * | 7/1974 | Hoch ........................... | 352/60 |
| 4,742,369 A | * | 5/1988 | Ishii et al. .................. | 396/213 |
| 4,831,452 A | * | 5/1989 | Takanashi et al. .......... | 348/340 |
| 5,008,697 A | | 4/1991 | Noble | |
| 5,745,171 A | * | 4/1998 | Ogawa et al. ............... | 348/234 |
| 5,847,836 A | * | 12/1998 | Suzuki ........................ | 358/296 |
| 5,847,887 A | * | 12/1998 | Ogura et al. ................ | 359/822 |
| 6,259,863 B1 | * | 7/2001 | Maruyama ................... | 396/177 |
| 6,373,583 B1 | * | 4/2002 | Jang ............................ | 348/273 |

FOREIGN PATENT DOCUMENTS

| | | |
|---|---|---|
| JP | 57081250 | 5/1982 |
| JP | 63077040 | 4/1988 |
| JP | 06090393 | 3/1994 |
| JP | 06141217 | 5/1994 |
| JP | 06301111 | 10/1994 |

* cited by examiner

*Primary Examiner*—Tuan Ho
(74) *Attorney, Agent, or Firm*—John C. McMahon

(57) ABSTRACT

Device for the alternate or simultaneous filming of still and video pictures or multipurpose camera, characterized by the combination of a video camera and a still camera in one single device which is equipped with a single interchangeable lens, an optical assembly, in addition to a system of prisms, mirrors or other similar reflecting components, which transmit the virtual image, understood as being the image which has not undergone any electrical, magnetic or digital processing, duplicated to a video mechanism and to a still picture mechanism for its individual, alternate or simultaneous processing.

4 Claims, 7 Drawing Sheets

Figure 1:
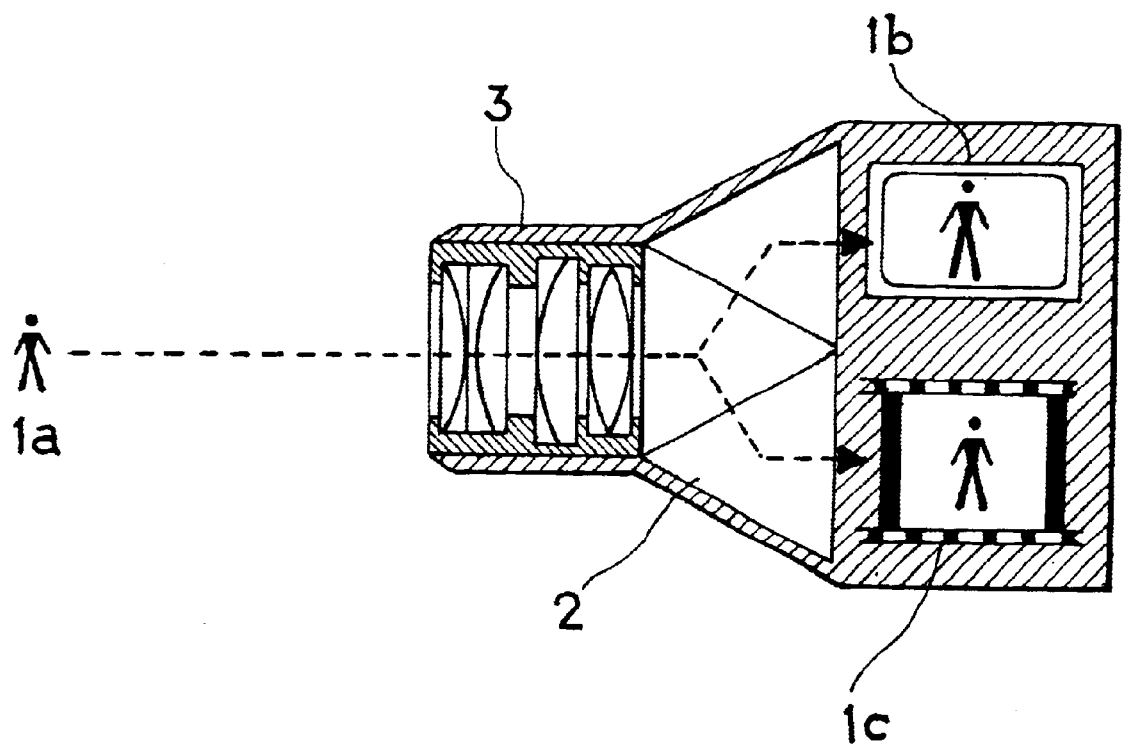

COMBINED STILL CAMERA AND VIDEO CAMERA DEVICE UTILIZING OPTICS TO SIMULTANEOUSLY PROVIDE THE SAME VIEW TO BOTH CAMERAS

The purpose of this invention is related, as its title indicates, to a device for the alternate or simultaneous filming of still and video pictures or multipurpose camera which affords some major advantages over the means currently being used for this purpose.

Currently, due to the growing popularity of video cameras, due basically to factors including those such as the lower price thereof, in addition to their having become easier to handle and more versatile, this has led to many users deciding to film video accounts in order to keep a record of trips, social events, sporting events, family events, investigations, etc. in picture form. Nevertheless, most users are still making a record of the same events in still pictures and/or taking snapshots which are being used in many cases as a supplement to the video film or other picture-taking means.

There are different products on the market which have attempted to combine or link the fields of video and still photography. Hence, there are, on one hand, CR-type cameras which store the pictures on a storage medium or disc, affording the possibility of the subsequent processing of said pictures. Likewise, there are different types of picture printers which make it possible to make a paper print of a video picture from a VCR, a television, a computer or similar systems. Likewise, there are different models of improved cameras which afford the possibility of developing still photographs on paper or slides from a video frame by taking a snapshot of the VCR screen.

However, none of the currently-existing systems affords the possibility of simultaneously shooting still and video pictures while in operation. Hence, said equipment is limited exclusively to a complex and very limitedly versatile subsequent processing which involves stages of setup, of tracking or searching for pictures and of printing which in most cases are highly time-consuming and involve complex data processing systems to control the entire set of pictures of which a user may avail. Apart from this, most of these systems do not function directly with the light, as would be desirable on the part of any technician in the field of photography, but rather the final product is processed based on more or less highly involved circuitry and/or software-based changes made in an electrical, magnetic or digital signal. Additionally, the cost of these systems leads to their being beyond the reach of non-professional users in most cases.

For the purpose of efficiently correcting the shortcomings currently existing in these systems and of providing a suitable link between the fields of video and still photography, the device for the alternate or simultaneous filming of still photographs and video or multipurpose camera comprising the object of this invention has been developed.

The present invention has to do with a device built by combining a video camera and a still camera in one single device which can function either simultaneously or separately as a camera for filming video and/or taking still shots.

To this end, the device for the alternate or simultaneous filming of still and video pictures or multipurpose camera comprising the object of the present invention incorporates the components inherent to a video camera as well as to a still camera, one sole interchangeable lens, an optical assembly, in addition to a system of prisms, mirrors or other similar reflecting components which transmits the virtual image, understood to be the image which has not undergone any electrical, magnetic or digital processing, which has been recorded to the video mechanism and to the still mechanism for its individual, alternate or simultaneous processing.

To achieve the proper working order of the device for the alternate or simultaneous filming of still or video pictures or multipurpose camera comprising the object of the present invention, a switch is provided for setting one of the four operating modes, which are, device off or disabled, video camera operating mode, still camera operating mode and simultaneous video camera and still camera operating mode, characterized because by means of pressing one single double button, one of the many frames of which a certain video filming is comprised is recorded in still form.

For the purpose of achieving a device for the alternate or simultaneous filming of still and video pictures or versatile, easy-to-handle and economical multipurpose camera, there are different common components which are used in both the video camera and in the still camera, such as, the optical assembly, the photometric system, different electronic circuitry, date stamps, etc. Likewise, it is provided with one single optical viewfinder which works the same way, simultaneously, both for the video camera and for the still camera, in any of the operating modes of the device, located in a position on the central lengthwise axis of the upper surface of the device, with the ability to revolve on either a horizontal or vertical plane, of a telescopic type, and capable of being folded up into the camera body for carrying.

Lastly, the device for the alternate or simultaneous filming of still and video pictures or multipurpose camera is preferably equipped with means for connection to other film processing means, such as film printers, making the device comprising the object of the present invention compatible with other currently-existing film processing systems.

Based upon all that which is described hereinabove, the advantages afforded by the device for the alternate or simultaneous filming of still and video pictures or multipurpose camera comprising the object of the present invention are readily inferred, such as, the fact of combining the video camera and still camera functions in one single, simple device, making it possible to use both picture processing techniques, both separately and simultaneously, by means of setting the operating mode using a single switch, with the added advantage of the resulting savings on space and weight, without the need of including any subsequent picture processing.

For a more in-depth comprehension of the object of the present invention, a description is provided in following of a preferred embodiment of the device for the alternate or simultaneous filming of still and video pictures or multipurpose camera based on the attached Figures. Said Figures include the following:

FIG. 1 provides a diagram of the optical assembly as well as of the system of prisms, mirrors or other reflecting components which transmit the virtual image recorded to the video mechanism and to the still picture mechanism for its individual, alternate or simultaneous processing.

Figure 2A:
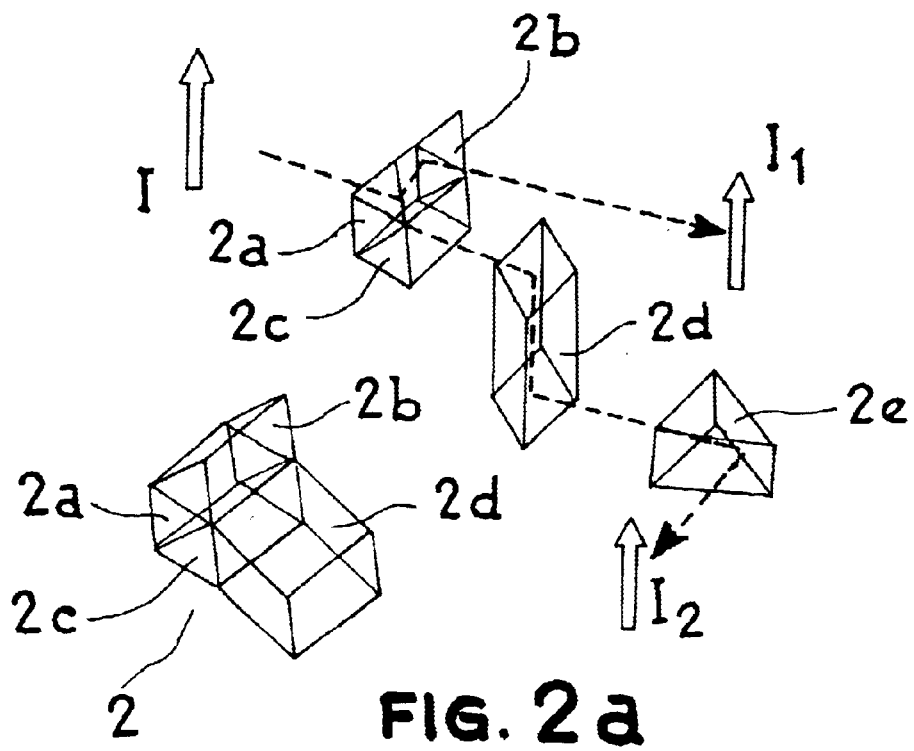
Figure 2B:
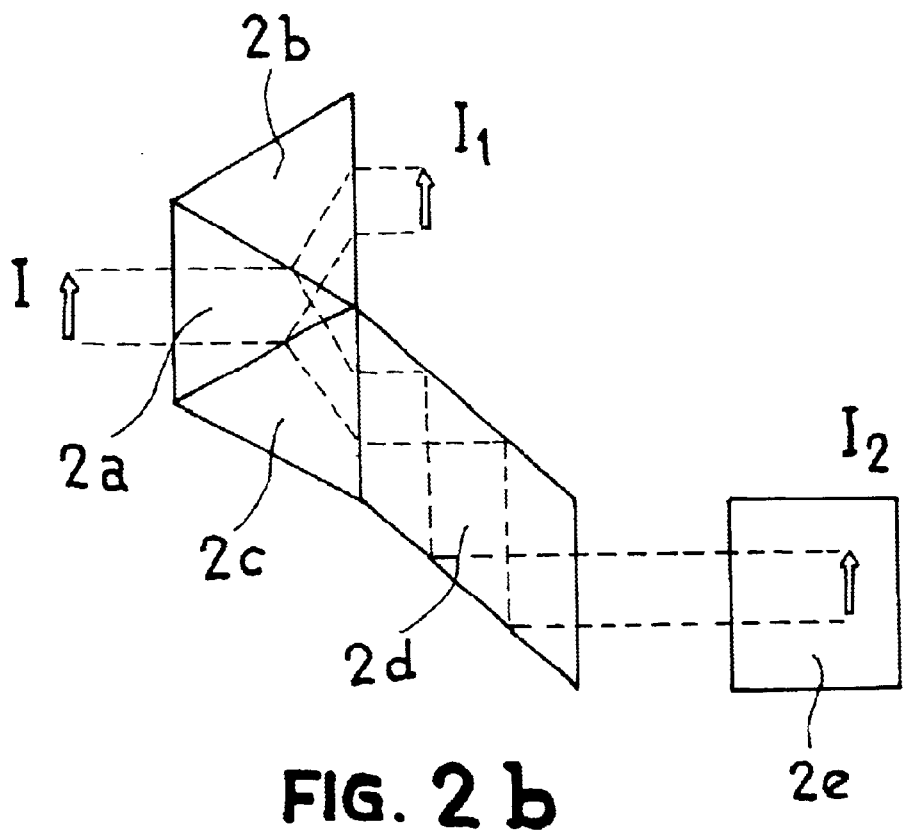
Figure 3A:
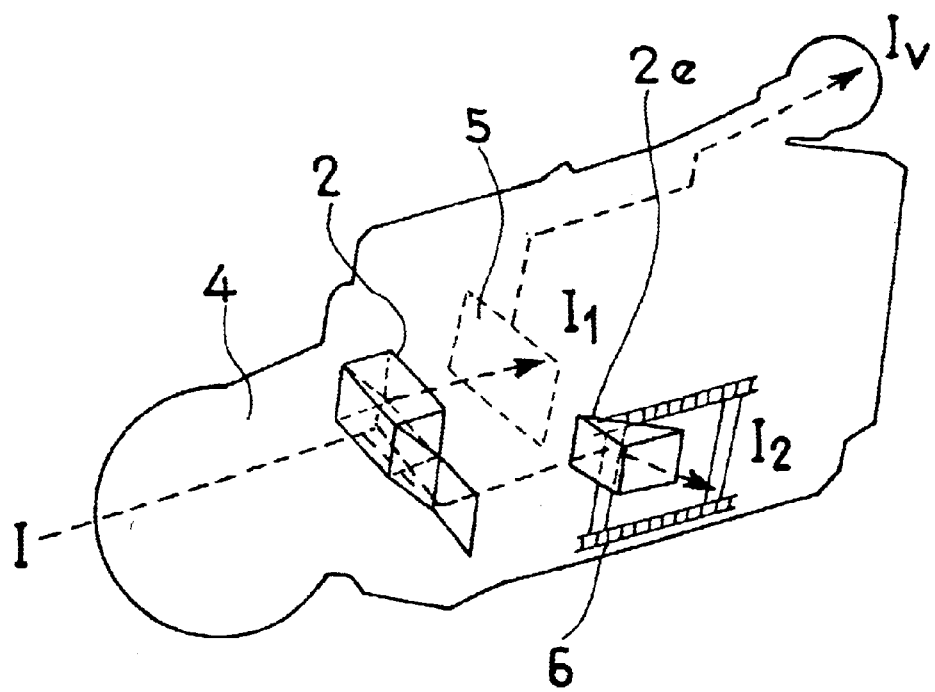
Figure 3B:
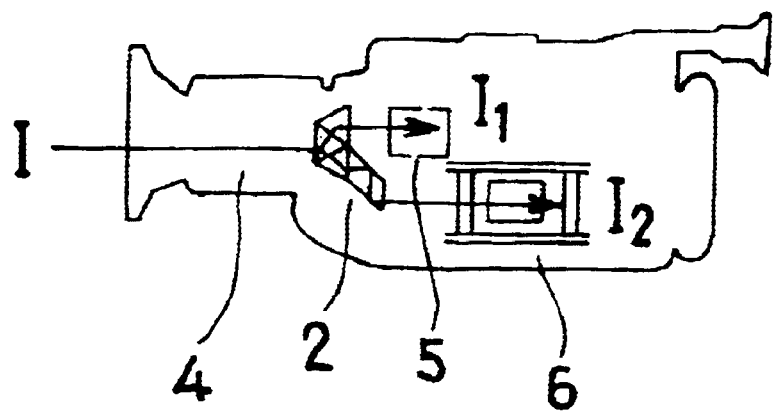
Figure 3C:
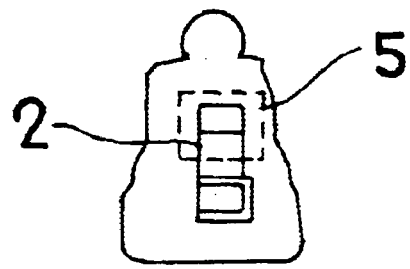
Figure 3D:
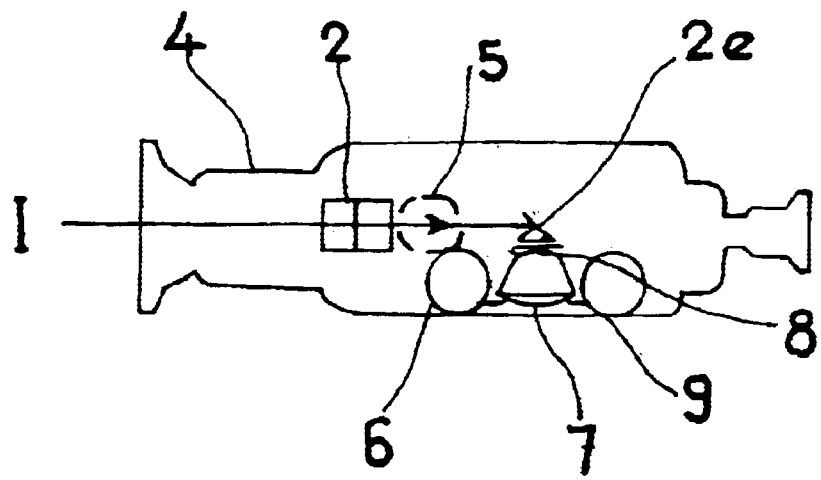
Figure 4A:
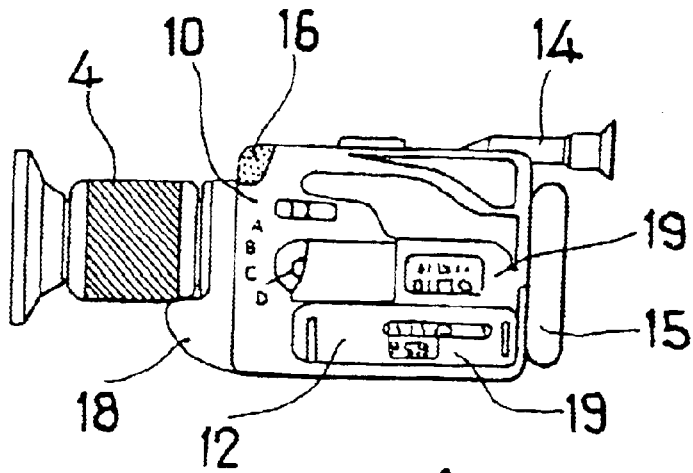
Figure 4B:
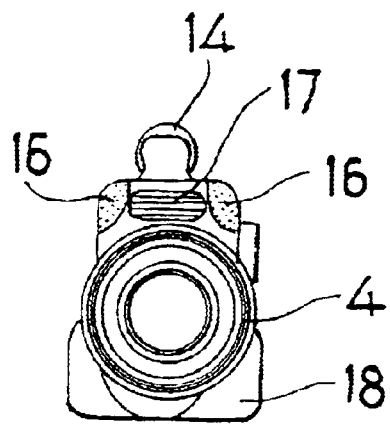
Figure 4C:
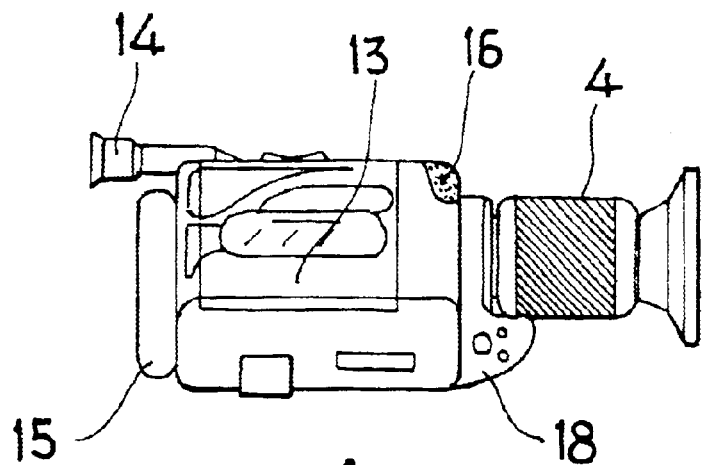
Figure 4D:
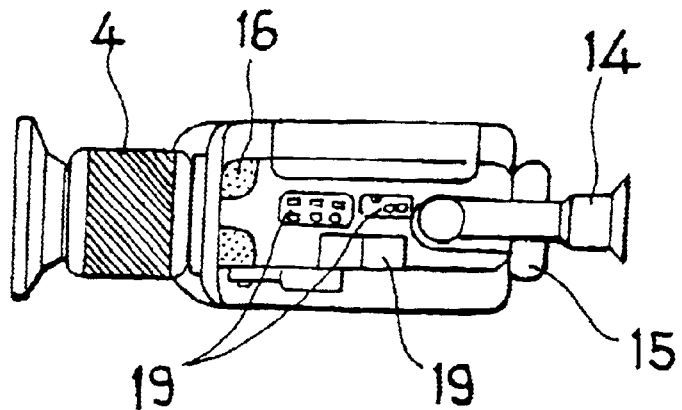
Figure 4E:
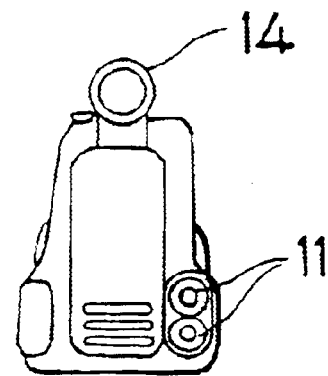
Figure 4F:
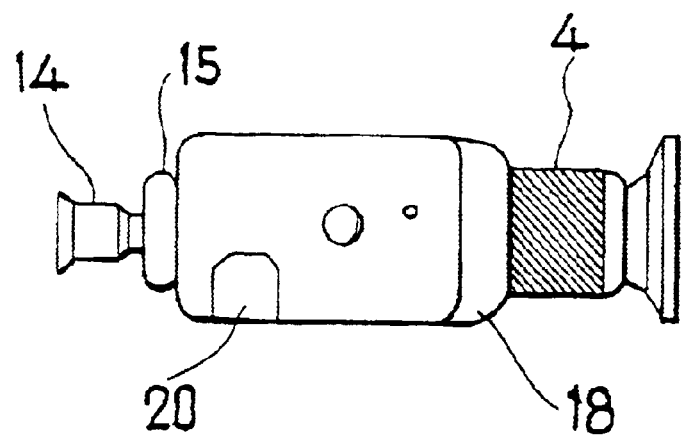

FIG. 2a and FIG. 2b respectively provide a perspective view and a plan view of one example of a layout of the prism system stated in FIG. 1.

FIGS. 3a, 3b, 3c and 3d respectively provide diagrams of a perspective view, a side view, a front view and a top view of inside details of the device for the alternate or simultaneous filming of still and video pictures or multipurpose camera.

FIGS. 4a, 4b, 4c, 4d, 4e and 4f respectively provide a left side view, a front view, a right side view, a top view and a rear view of the device for the filming of still and video pictures or multipurpose camera.

FIGS. 5a, 5b, 5c and 5d show the incorporating of different types of interchangeable lenses in that of the device for the alternate or simultaneous filming of still of video pictures or multipurpose camera.

FIG. 1 provides a diagram of the components comprising the device for the alternate or simultaneous filming of still and video pictures or multipurpose camera comprising the object of the present invention, which incorporates the components inherent to a video camera in addition to those inherent to a still camera, one single interchangeable lens, an optical assembly (3), in addition to a system of prism (2), which in other embodiments should be a system either of mirrors or other similar reflecting components, which transmit the virtual image (1a), understood as being the image which has not undergone any electrical, magnetic or digital processing, recorded to the video mechanism (1b) and to the still mechanism (1c) for its individual, alternate or simultaneous processing.

The preferred arrangement of the prism system (2) which makes it possible for the virtual image (1a) to be transmitted to the video mechanism (1b) and to the still mechanism (1c), is shown in FIGS. 2a and 2b, where a detailed description is provided of the reflections and refractions which the original image (I) undergoes up to the point of reaching each one of the above-mentioned mechanisms, obtaining the picture on the video camera ($I_1$), which will be used by the electronic retina of the video section, and the still camera picture ($I_2$), which will be used by the shutter and the aperture plate of the still section, both images being simultaneously and constantly present. To this end, the system of prisms (2) is preferably comprised of an initial equilateral prism (2a) and a second equilateral prism (2b) for obtaining the video camera image ($I_1$) and, preferably, of an initial equilateral prism (2a), of a third equilateral prism (2c), of a rhomboid prism (2d) and of a right-angle prism (2e) for obtaining the still camera picture ($I_2$).

The image transmitted to the video section ($I_1$) is preferably relayed to the viewfinder by conventional means used in video cameras (not shown in the Figures).

FIGS. 3a, 3b, 3c and 3d show the placement of the prism system (2) described above inside the device for the alternate or simultaneous filming of still and video pictures or multipurpose camera. The original image (I) is picked up and put into the device through the interchangeable lens (4) up to the prism system (2) described hereinabove, which, by means of a mechanism of reflections and refractions convert the original image (I) into a first image ($I_1$), which is transmitted to the video section, up to the video retina (5), from which it is additionally relayed to the viewfinder ($I_v$) by conventional means (not shown in the Figure), and into a second image ($I_2$), transmitted to the still picture section, which is projected onto the picture film (6) located in the camera obscura (7) equipped with the conventional photographic components, such as the aperture plate (8) and the shutter (9).

With regard to FIGS. 4a, 4b, 4c, 4d, 4e and 4f, which provide different views of the outside of an embodiment of the device for the alternate or simultaneous filming of still and video pictures or multipurpose camera comprising the object of the present invention, in order to achieve the proper working order of said device, it is equipped with a switch (10) on the outside for setting one of the four operating modes, which are, device off or disabled (A), video camera operating mode (B), still camera operating mode (C) and simultaneous video and still camera operating mode (D), characterized because by means of pressing a single double button (11), one of the many frames of which a certain video recording is comprised is recorded as a still picture.

Additionally, the device for the alternate or simultaneous filming of still and video pictures or multipurpose camera comprising the object of the present invention incorporates the mechanisms and components inherent to a video camera and a still camera. Hence, in FIGS. 4a, 4b, 4c, 4d, 4e and 4f, in components such as the interchangeable lends (4), the still film aperture component (12), under which the roll of film or slides is positioned, the video aperture component, under which the videotape is positioned, the optical viewfinder (14), which works the same way for both the video section and the still section, preferably in color for the purpose of being able to best judge the quality of the video and/or still image to be filmed, the preferably rechargeable power supply battery (15), the preferably stereo microphone (16), the preferably automatic electronic flash (17), which makes it possible to suplement the outside lighting conditions, the lens motor assembly (18), the purpose of which is that of automatic focusing, zoom or any other focusing feature the interchangeable lens (4) by means of the push-button controls (19) provided for this purpose and a preferably Lithium internal battery (20) for powering the internal calendar and clock.

As is shown in FIGS. 4a, 4b, 4c, 4d, 4e and 4f, the device for the alternate or simultaneous filming of still and video pictures or multipurpose camera is equipped with a single optical viewfinder (14) which works the same way, simultaneously, for both the video camera and for the still camera in any of the device's operating modes, positioned on the central lengthwise axis on top of the device, able to turn on both the horizontal and vertical place, of the telescopic type, and able to be folded into the camera body for carrying.

Figure 5A:
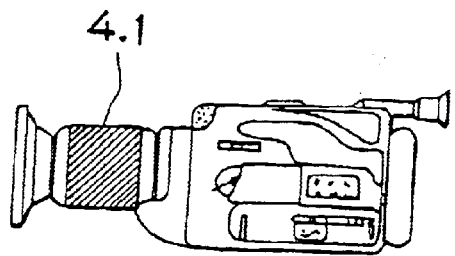
Figure 5B:
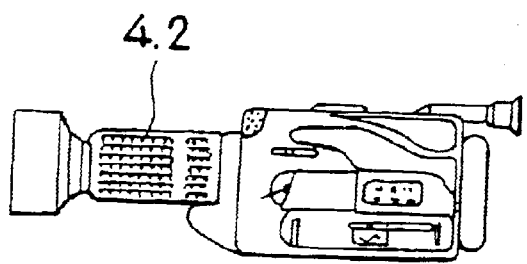
Figure 5C:
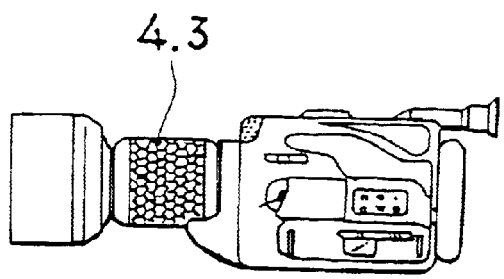
Figure 5D:
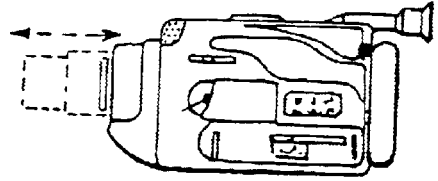

Lastly, FIGS. 5a, 5b and 5c provide examples for installing interchangeable lenses (4.1, 4.2, 4.3) on the body of the device for the alternate or simultaneous filming of still and video pictures or multipurpose camera, whilst FIG. 5d shows said device without any lens, the telecoping capabilities of the lens being drawn in dotted-line form.

The nature of the present invention and one embodiment thereof having been sufficiently described, it must be added at this point that changes may be made in the shape, materials or layout of the whole or parts thereof provided that said modifications do not substantially vary the features of the invention which are claimed in following.

What is claimed is:

1. A device adopted for the alternate or simultaneous filming of still and video pictures, comprising a video camera and a still camera in a single unit that is equipped with a single interchangeable lens, a system for doubling an initial image, and a switch arranged to select one of the following four operating modes:

a) device off or disabled;
   b) video camera operating mode;
   c) still camera operating mode; and
   d) simultaneous video camera and still camera operating mode, wherein the system for doubling the initial image into first and second duplicate images comprises an initial prism and a second prism to produce the first duplicate image for the video camera, and a combination of said initial prism, a third prism, a rhomboid prism and a right-angle prism for obtaining the second duplicate image for the still camera.

2. A device for taking still and video pictures comprising:

a) a still camera for taking the still pictures;

b) a video camera for taking the video pictures;

c) an optical system for producing first and second duplicate images from an original image; said optical system including a first prism operably aligned and positioned so as to produce said first and second duplicate images from said original image and then direct said first duplicate image to said still camera and said second duplicate image to said video camera;

d) said optical system including a second prism receiving said first duplicate image from said first prism and transferring said first duplicate image therethrough to a rhomboid prism and thereafter to a right-angle prism and finally to said still camera; and e) said optical system including a third prism for receiving said second duplicate image from said first prism and thereafter transferring said second duplicate image to said video camera.

3. The device according to claim 2 including:

a) a switch allowing a user to select between an off mode, a first on mode wherein said still camera operates only, a second on mode wherein said video camera operates only and a third on mode wherein both said still and video cameras operate.

4. The device according to claim 2 wherein:

a) said initial prism is an equilateral prism.

\* \* \* \* \*